United States Patent [19]

Morgan

[11] 4,360,752

[45] Nov. 23, 1982

[54] NUTATING MOTOR GATE VALVE OPERATOR AND ROTOR ASSEMBLY

[75] Inventor: William L. Morgan, Seattle, Wash.

[73] Assignee: Morgan Actuators, Inc., Seattle, Wash.

[21] Appl. No.: 128,653

[22] Filed: Mar. 10, 1980

[51] Int. Cl.³ .............................................. H02K 7/06
[52] U.S. Cl. ....................................... 310/82; 310/80; 310/83; 74/60; 74/424.8 VA
[58] Field of Search ....................... 310/82, 83, 84, 80, 310/266, 219; 251/266; 74/60, 424.8 VA, 800

[56] References Cited

U.S. PATENT DOCUMENTS

| | | | |
|---|---|---|---|
| 2,956,188 | 10/1960 | White | 74/424.8 VA |
| 3,220,282 | 11/1965 | Magos | 74/424.8 VA |
| 3,327,826 | 6/1967 | Henschke | 74/424.8 VA |
| 3,530,322 | 9/1970 | Newell | 310/82 |

FOREIGN PATENT DOCUMENTS 238053 6/1945 Switzerland ........................ 310/219

Primary Examiner—J. D. Miller
Assistant Examiner—D. L. Rebsch
Attorney, Agent, or Firm—Seed, Berry, Vernon & Baynham

[57] ABSTRACT

A rotor for a nutating motor has an annular cavity formed in one face thereof, which cavity receives a helically wound ring of magnetically permeable material.

A gate valve operator assembly couples the hollow output shaft of a nutating motor to a valve stem, which axially moves within the hollow output shaft. An internally threaded spindle, or stem nut, is rotatably mounted to engage the externally threaded valve stem. The spindle and the hollow motor shaft are coupled together by means of a tab engaging a correspondingly formed notch. Axial movement of the spindle is prevented by means of a flanged radially extending circumferential rim formed as part of the spindle.

7 Claims, 3 Drawing Figures

NUTATING MOTOR GATE VALVE OPERATOR AND ROTOR ASSEMBLY

BACKGROUND OF THE INVENTION

1. Field of the Invention

This invention relates to nutating motors and to valve operators driven by nutating motors.

2. Prior Art Relating to the Disclosure

Nutating motors are frequently used to operate large fluid-control valves because such motors provide high torque at low operating speeds. The valves produce significant axial thrust forces, and the prior drive mechanisms for those valves have therefore required bulky gear boxes or offset drives, which are not suited for shipboard installations or installations wherever space and clearance are limited. Further, the rotors for nutating motors are often machined from solid steel blanks which do not have optimum magnetic characteristics, so that the motor itself has less than optimum performance characteristics.

SUMMARY OF THE INVENTION

It is therefore an object of this invention to provide a valve operator driven by a nutating motor which limits the axial thrust forces exerted on the nutating motor.

It is another object of the invention to provide a nutating motor-driven valve operator in a compact configuration.

It is another object of the invention to provide a nutating motor rotor assembly which uses an insert of magnetic material to optimize the magnetic characteristics of the rotor.

Basically, the objects are achieved by providing a coupling between a hollow output nutating motor shaft and a coaxially interfitting valve stem, which coupling converts the rotary motion of the motor shaft to linear motion of the valve stem. A coupling spindle includes a flange radially extending circumferential flange which advantageously absorbs axial thrust from the valve while permitting rotation of the spindle about the common axis of the valve stem and the hollow nutating motor output shaft.

A rotor for a nutating motor includes a disc-like rotor body which has a cavity formed in one of its faces for receiving an insert which, in one embodiment, is a strip of magnetically permeable material wound to form a ring advantageously positioned within the cavity to form part of the magnetic circuit for the motor.

BRIEF DESCRIPTION OF THE PREFERRED EMBODIMENTS

Figure 1:
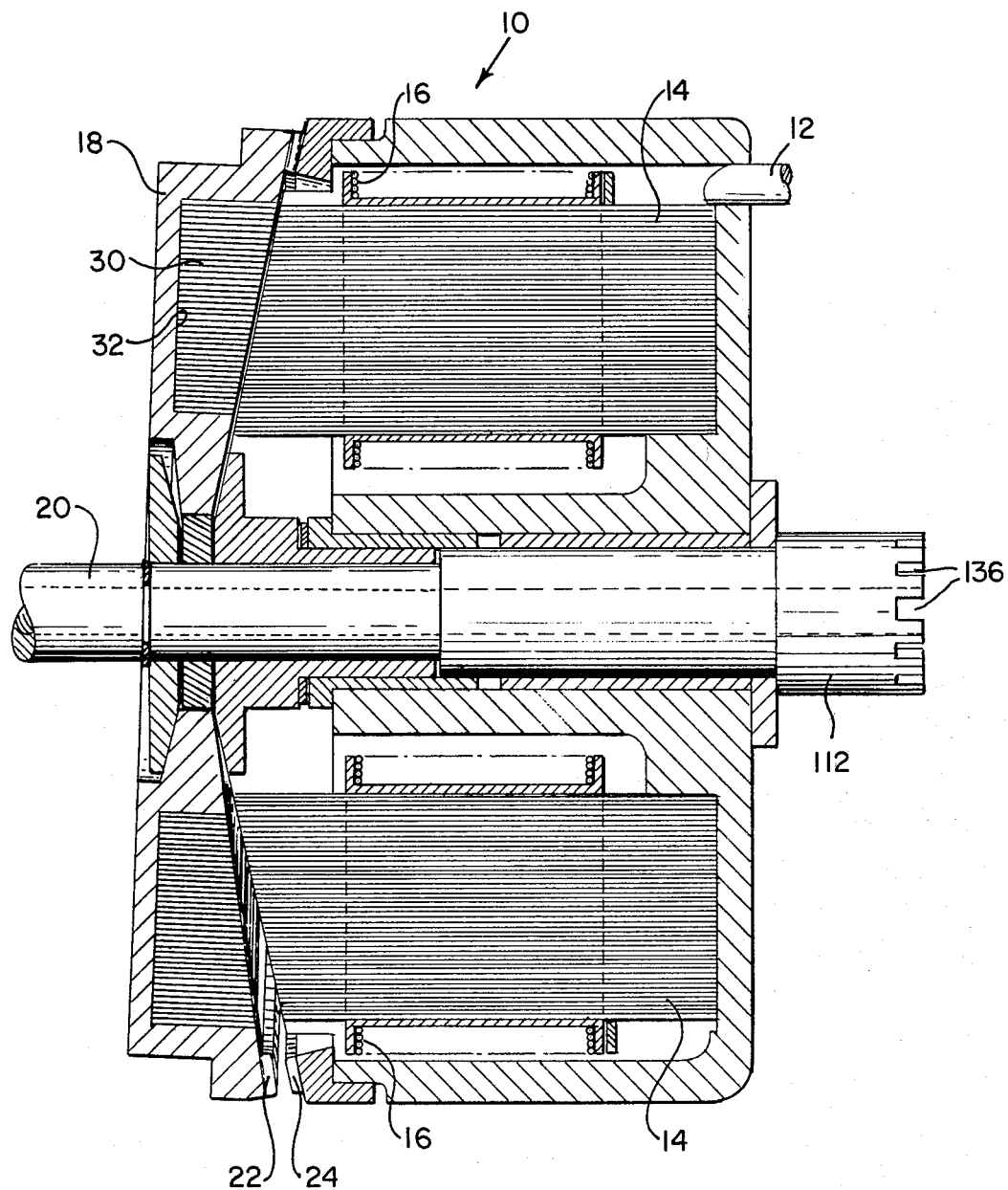
FIG. 1 is a partial sectional view of a nutating motor.

Referring to FIG. 1 of the drawing, a representative nutating motor assembly 10 is shown. The motor assembly includes a plurality of magnetically permeable stator pole pieces 14 which are spaced around the circumference of a circle. Each of the stator pole pieces 14 is energized by means of a coil winding 16 around each of the pole pieces 14 as shown. The windings 16 are activated through conductor pairs in a cable 12 from a control circuit. A nutating element, or rotor 18, is pivotably coupled to a hollow motor output shaft 20. The rotor 18 nutates or moves with a wobbling motion as adjacent stator pole pieces 14 are sequentially energized. This causes a segment of the rotor 18 to be drawn by the magnetic field of a stator pole piece toward the stator so that the corresponding teeth of oppositely facing ring gears 22, 24, which are respectively formed on the rotor 18 and the stator, engage. The number of teeth on the ring gears are different so that as the rotor 18 completes one nutation cycle, the rotor 18 rotationally advances an angular distance equal to the difference in the number of teeth on the ring gears 22, 24. The nutating motion of the rotor 18 is thereby translated to a rotational movement of the hollow shaft 20 about its axis.

Figure 3:
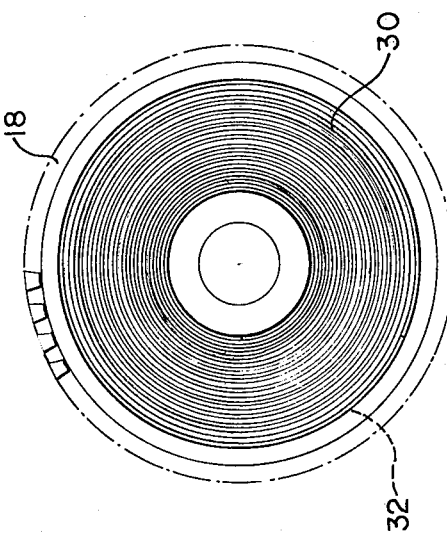
FIG. 3 is an elevation view of the inside face of the nutating motor rotor shown in FIG. 1, which has a helically wound insert.

In order to enhance the magnetic characteristics of the rotor 18, a ring 30 of high-permeability magnetic material is inserted and held with a suitable bonding material in an annular cavity 32 machined in the rotor 18. The ring 30, shown in FIG. 3, is helically wound from a thin strip of high-permeability grain-oriented steel which has magnetic properties superior to the steel forming the rotor 18. The strip has a very thin insulating layer on its surface and is wound and adhesively bonded with a conventional bonding material with its outside edges facing the stator pole pieces 14. The ring 30 is machined to have an oblique outside face corresponding to the oblique faces of the pole pieces so that the width of the strip forming the ring 30 increases toward the outside of the ring. Eddy current and hysteresis losses are minimized by the laminated construction and the superior magnetic properties of the ring 30. The high permeability of the ring material reduces the reluctance of the magnetic circuit formed by the rotor and the stator. This provides increased magnetic flux and improved electrical efficiency for the motor.

Figure 2:
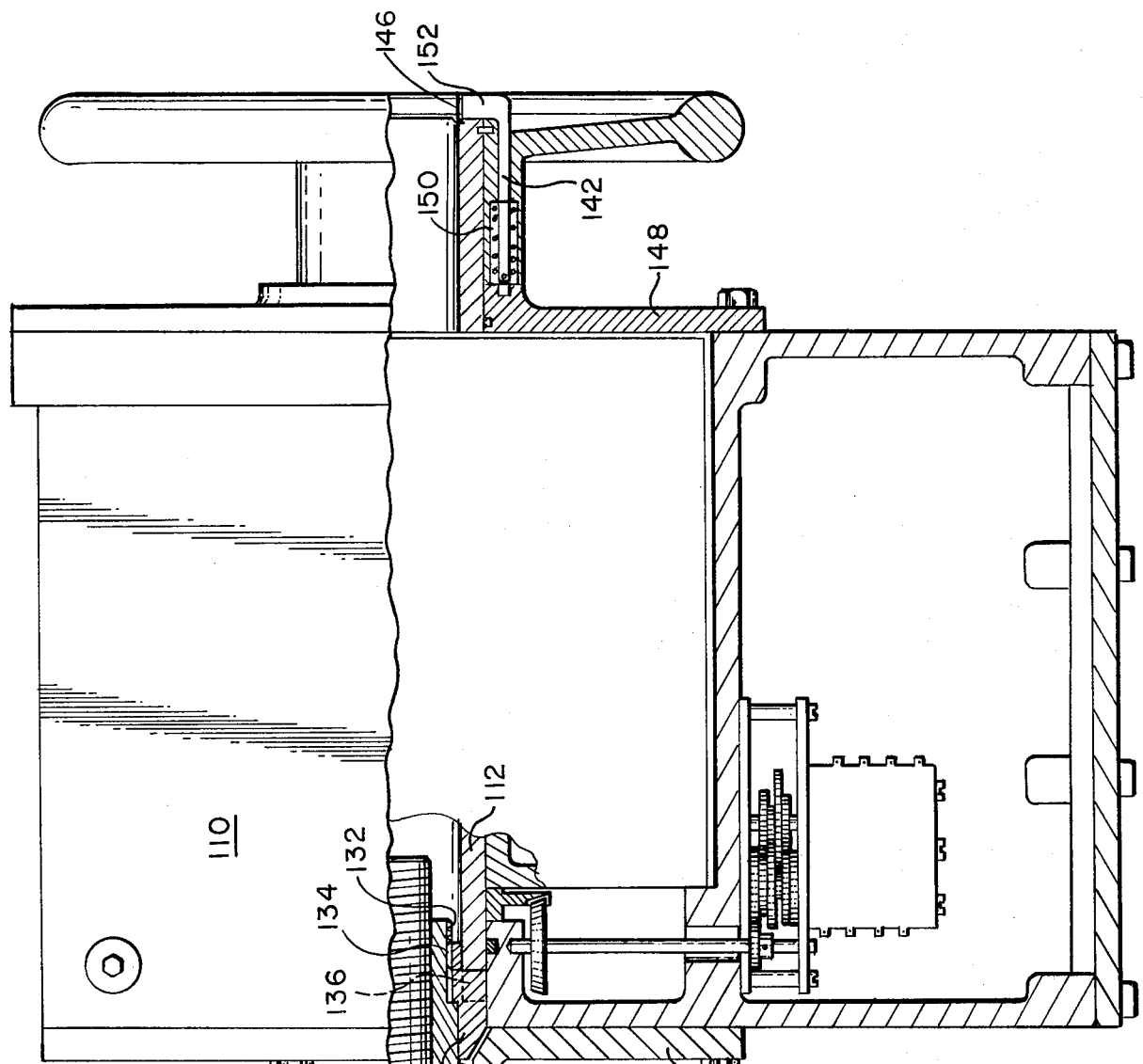
FIG. 2 is a partial sectional view of a gate valve assembly and a nutating motor for operating the valve.

Referring to FIG. 2, a nutating motor housing 110 mounts a motor assembly generally of the type shown in FIG. 1 directly to a gate valve assembly 114. The gate valve assembly 114 is partially shown having a valve bonnet 115, which is a yoke-like structure which provides rotational support and guidance for an externally threaded valve stem 116. The motor assembly 10 is concentrically mounted relative to the valve stem such that the valve stem 116 moves axially through the hollow motor shaft, providing a compact arrangement for delivering driving torque to a large gate valve. A frame, including an end cover plate 118, is attached to the valve bonnet 115 and supports the motor housing 110. An end plate cover 118 has an outwardly projecting, externally threaded collar, or sleeve, 120 which threadably engages internal threads formed in the walls adjacent a central bore formed in the valve bonnet 115. A lock nut 122 engages the external threads on the collar 120 and locks the collar 120 to the valve bonnet 115. A cylindrical stem nut, or coupling spindle, 126 has a central aperture formed therein and has threads formed in the walls adjacent the aperture for engagement with the external threads of the valve stem 116. The spindle 126 serves as a coupling to convert the rotary motion of the hollow shaft 20 to linear motion of the valve stem 116. The spindle 124 has at one end a radially extending circumferential flange which fits within a corresponding space formed by the end of the collar 120 and the interior face of the chamber formed by the central bore in the valve bonnet 115. The spindle 124 can only rotate and the flange 126 prevents axial movement of the spindle. Thus, the axial thrust forces are carried by the flange 126 to the motor and valve frame structures rather than to the motor output shaft. An end 112 of the nutating motor shaft is coupled to the spindle 124 by a collar 130 threaded to the exterior of the spindle 126. Steps are formed on both the spindle 124 and the collar 130 for axially locating the collar 130 on the spindle 126. A spline 132 engaging grooves formed in both the spindle 126 and the collar 130 prevents relative rotation. A lock nut 134 is threaded onto an externally threaded end portion 136 of the spindle 126 and locks the collar 130 in position of the spindle 126. Axially extending tabs 136 formed at the end 112 of the hollow shaft engage corresponding grooves formed in the collar 130. This provides a means for coupling the rotational movement of the hollow shaft to the spindle 126. The valve stem 116 travels within the hollow nutating motor shaft to provide a compact configuration. The flange of the spindle 126 absorbs the forces caused by the axial movement of the valve stem 116. The nutating motor assembly 110 also includes a hand wheel 140 which is connectable to the output shaft of the motor. The hand wheel 140 provides an auxiliary means for moving the output shaft. A locking pin 142 has an L-shaped end 152 which engages a slot 146 formed in the output shaft. When the end 152 of the pin 142 engages the slot 146, the hand wheel 140 and the output shaft are locked together. A spring 150 biases the locking pin into the slot 146.

While a particular embodiment of the invention has been shown and described, it should be understood that the invention is not limited thereto. It is intended to cover by the instant application any modifications which fall within the true spirit and scope of the invention as disclosed and claimed herein.

I claim:

1. A valve operator, driven by a nutating motor having a hollow output shaft, comprising:

said motor being located centrally of said valve operator and having said hollow output shaft rotatable about an axis;
    a linearly movable valve stem coaxially aligned with the hollow output shaft, said valve stem and hollow output shaft adapted to coaxially interfit; and
    coupling means between the hollow output shaft and the valve stem for converting the rotary motion of the hollow output shaft to linear motion of the valve stem.

2. The valve operator of claim 1, wherein the coupling means includes means for isolating the axially directed thrust of the valve stem from the hollow output shaft.

3. The valve operator of claim 2, including a frame for mounting the nutating motor to the valve so that the hollow output shaft and the valve stem are coaxially aligned for rotation about the axis; and wherein the coupling means includes a spindle having threads for threaded coaxial engagement with said threaded valve stem, said isolating means including a spindle having a radially extending circumferential flange which slidably engages the frame and isolates the axially directed thrust of the valve stem to prevent axial movement of the spindle while permitting rotation about the axis.

4. The valve operator of claim 3, wherein the coupling means includes an axially extending tab and a correspondingly formed notch, which are engageable to couple the spindle and the hollow shaft.

5. The valve operator of claim 1, wherein the coupling means includes a removable collar fixed to said spindle and having a plurality of tabs formed therein for engaging with a plurality of tabs formed on the hollow output shaft.

6. The valve operator of claim 3, wherein the frame includes a threaded sleeve portion coaxial with said valve stem for threaded engagement with a correspondingly threaded portion of the valve.

7. The operator of claim 1, including a hand wheel rotatably mounted on the output shaft and means releasably drivingly coupling the hand wheel to the output shaft for manually turning the output shaft.

* * * * *